(12) United States Patent
Burman et al.

(10) Patent No.: US 9,424,347 B2
(45) Date of Patent: Aug. 23, 2016

(54) TECHNIQUES PERTAINING TO DOCUMENT CREATION

(71) Applicant: Hewlett-Packard Development Company, L.P., Houston, TX (US)

(72) Inventors: Gemma Burman, Bangalore (IN); Anjaneyulu Seetha Rama Kuchibhotla, Bangalore (IN); Siddharth Kalita, Banglalore (IN); Ninoj Antony, Bangalore (IN); Eniyan Thiruvidam, Bangalore (IN); Geeta Pai, Bangalore (IN)

(73) Assignee: Hewlett-Packard Development Company, L. P., Houston, TX (US)

( * ) Notice: Subject to any disclaimer, the term of this patent is extended or adjusted under 35 U.S.C. 154(b) by 712 days.

(21) Appl. No.: 13/743,241

(22) Filed: Jan. 16, 2013

(65) Prior Publication Data

US 2014/0201131 A1 Jul. 17, 2014

(51) Int. Cl.
*G06F 17/30* (2006.01)
*G06F 17/21* (2006.01)
*G06Q 10/10* (2012.01)

(52) U.S. Cl.
CPC .......... *G06F 17/30722* (2013.01); *G06F 17/21* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 6,507,845 B1 * | 1/2003 | Cohen et al. | 707/608 |
| 6,515,681 B1 | 2/2003 | Knight | |
| 7,761,393 B2 | 7/2010 | Macbeth et al. | |
| 7,818,678 B2 | 10/2010 | Massand | |
| 7,933,952 B2 | 4/2011 | Parker et al. | |
| 2004/0216039 A1 * | 10/2004 | Lane et al. | 715/511 |
| 2008/0154908 A1 * | 6/2008 | Datar et al. | 707/10 |
| 2009/0006936 A1 * | 1/2009 | Parker et al. | 715/200 |
| 2009/0006948 A1 * | 1/2009 | Parker et al. | 715/255 |
| 2009/0240553 A1 * | 9/2009 | Sato | 705/9 |
| 2009/0287674 A1 * | 11/2009 | Bouillet et al. | 707/5 |
| 2012/0036423 A1 * | 2/2012 | Haynes et al. | 715/230 |
| 2012/0185759 A1 * | 7/2012 | Balinsky et al. | 715/209 |

OTHER PUBLICATIONS

Leland et al., "Collaborative Document Production Using Quilt," ACM 1988, pp. 206-215.*
Ad hoc Workflows, "Transform the Way you Manage your Content," (Web Page), retrieved on Apr. 16, 2013 at http://www.adhocworkflows.com/features/2013.
(Continued)

*Primary Examiner* — Richard Bowen
(74) *Attorney, Agent, or Firm* — HP Inc Patent Department

(57) ABSTRACT

Disclosed are techniques pertaining to the creation of a social document through a collaboration. A server executing a social document management application may create a document comprised of content. The social document management application may also create an adhoc workflow process associated with the document in which the workflow process includes steps to create the content of the document. Collaborators may be assigned to work on the steps of the workflow process. In addition, tasks associated with the steps of the workflow process may be assigned to the collaborators and tracked. The tasks may be assigned by selecting content directly within the document and assigning a task pertaining to the selected content. The steps of the workflow process may then be approved.

14 Claims, 12 Drawing Sheets

(56) References Cited

OTHER PUBLICATIONS

Competitive Analysis on some of the similar products. Note: The Competitive Analysis was done based on the product documentation available online.
Cynapse, "Group Collaboration & Social Computing Solutions," (Web Page), 2012, retrieved on Apr. 16, 2013 at <http://www.cynapse.com/solutions/technology-solutions/group-collaboration-social-computing; 2012.
Deliver Intelligent Engagement, (Web Page), https://www.anaplan.com/connected/.
Mollins, P., "Documents Need Collaboration, Collaboration Needs Structure," Aug. 7, 2012, <https://www.knowledgetree.com/blog/2012/08/1/documents-need-collaboration-collaboration-needs-structure>.
Group Collaboration & Social Computing Solutions; http://www.cynapse.com/solutions/technology-solutions/group-collaboration-social-computing; 2012.
Peter Mollins; Documents Need Collaboration, Collaboration Needs Structure; https://www.knowledgetree.com/blog/2012/08/1/documents-need-collaboration-collaboration-needs-structure Aug. 7, 2012.
Transform the Way You Manage Your Content, http://www.adhocworkflows.com/features/ 2013.

* cited by examiner

FIG. 4
400

Document Creation

1. Social Document Name

Name: | RFP Response |  ~ 402

Owner:  ~ 404

2. Define Workflow

[New Workflow] ~ 406   OR

Choose from an existing workflow:

| Name | Workflow | Collaborators |
|---|---|---|
| ⊙ Workflow 1  ~ 408 | Kickstart → Plan → Deep Dive | |
| ⊙ Workflow 2  ~ 410 | 1 → 2 → 3 → 4 | |

[ Go ]  [ Cancel ]

TECHNIQUES PERTAINING TO DOCUMENT CREATION

BACKGROUND

Quite often there is a need for an enterprise workforce (colleagues, experts, stakeholders, etc.) to collaborate to create content for enterprise documents. These collaborators may be distributed throughout the enterprise. Moreover, it is often difficult and time consuming to gather/exchange information for the document. Typically, document creation is done in phases such as creation of a draft document, exchanging reviews and changes, and finalization of the content/document. Such an effort may involve many heterogeneous tools and significant manual overhead.

BRIEF DESCRIPTION OF THE DRAWINGS

FIG. 4 illustrates an embodiment of a screen shot for one aspect of a user interface for the document creation system.

FIG. 10 illustrates an embodiment of a screen shot of a user interface window for one aspect of a user interface for the document creation system.

DETAILED DESCRIPTION

Figure 1:
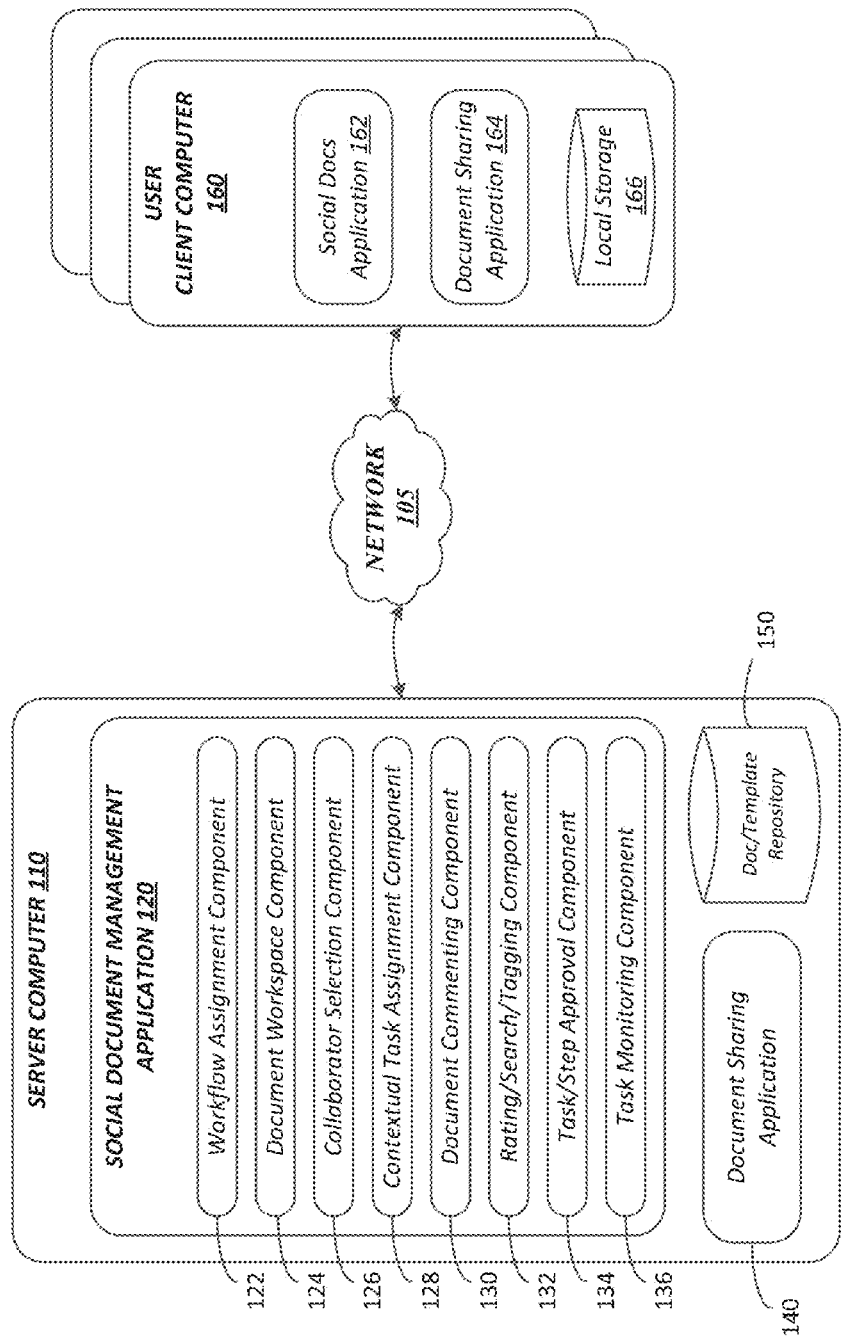
FIG. 1 illustrates an embodiment of a network architecture for a document creation system.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

There are many scenarios within an enterprise where there is a need to create content through workforce collaboration, adhoc workflows and enterprise social networking. Enterprise social networking may be characterized as the use of online social networks or social relations among people who share business interests and/or activities. Adhoc workflows may be characterized as workflows that may be defined on the fly and can be dynamically changed even by end users. The embodiments described herein support adhoc workflows in a seamless and powerful way enabling collective content creation that is contextual, agile, and thorough allowing users to connect with a distributed workforce of experts, exchange information, and collaborate efficiently to create a document/content. In addition, creation and adaptation of adhoc workflows may be achieved in a structured manner for streamlining content creation process with better visibility and tracking. Moreover, the assignment of tasks associated with document creation to collaborators may be handled at a contextual level. The embodiments described herein also enable tracking task status/completion leading to efficient collaboration for better informed decision making.

The embodiments described herein may be based on three (3) main concepts. In no particular order these include a mechanism for efficient collaboration using social media like technologies, creation and adaptation of adhoc workflows, and contextual task assignment. Collaboration using social media like concepts may associate document collaborators to particular document content, rating of document content and document research, and tag based search techniques. Adhoc workflows may provide a mechanism for streamlining document content creation processes, reviews, and iterations with better visibility and tracking. Contextual task assignment may provide a mechanism to assign and track tasks directly at a content level (e.g., a section of the document) using an intuitive easy to use user interface.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates an embodiment of a network architecture 100 for a document creation system. The network architecture broadly comprises a network 105, a server computer 110, and one or more user client computers 160. The network 105 may comprise one or both of the Internet or an intra-net such as a company's own internal computer network that may have selective access with the broader public network known as the Internet. The server computer 110 may include multiple software components executing on the server computer 110 and accessible to the user client computer 160 over network 105. The user client computer 160 may include user interface applications and local storage adapted to interface with the software components executing on the server computer 110.

The server computer may include a social document management application 120 comprised of several components including, in no particular order, a workflow assignment component 122, a document workspace component 124, a collaborator selection component 126, a contextual task assignment component 128, a document commenting component 130, a rating/search/tagging component 132, a task/step approval component 134, and a task monitoring component 136. In addition, a document sharing application 140 and a document/template repository 150 may be executing under the control of server computer 110. The document sharing application 140 may be used to distribute documents or files among a document owner and various document collaborators.

A user client computer 160 may include network enabled devices such as, but not limited to, a personal computer (PC), a tablet computer, a smartphone or other handheld computer device. The user client computer 160 may include a social docs application 162 that serves as a user interface to the social document management application 120 executing on the server computer 110. The social docs application 162 may employ a browser type application to present the user interface windows of the social document management application 120. A document sharing application 164 may be the client side interface to the server executing document sharing application 140 that is used to distribute documents or files among a document owner and various document collaborators. The document sharing application essentially performs a function of providing a suitable repository to ensure that updates and changes to the social document are consistently being made to the social document to ensure that it is always up to date and synchronized across the platform of users.

The client computers 160 may access the server side social document management application 120 via the browser type interface of the social docs application 162 and receive data that may be presented as one or more user interface windows that comprise the functions of the social document management application 140. Using a client server model, the client computer 160 may issue requests to the server social document management application 120 that cause the various user interface windows to appear on the client computer 160. The requests may be in the form of selections of icons (e.g., clicking on an icon) presented by the various user interface windows of the social document management application 120. The selection of an icon or hyperlink may be interpreted as a request to perform the action associated with the icon selected.

Each of the aforementioned social document management application components 122-136 as well as the document sharing application 140 and document/template repository 150 of server computer 110 are more fully described with reference to the logic flow diagram of FIG. 2 and the screen shots of FIGS. 3-12. Similarly, the interactions among the social docs application 162 and document sharing applications 164 of the user client computer 160 are more fully described with reference to the logic flow diagram of FIG. 2 and the user interface screen shots of FIGS. 3-12.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

Figure 2:
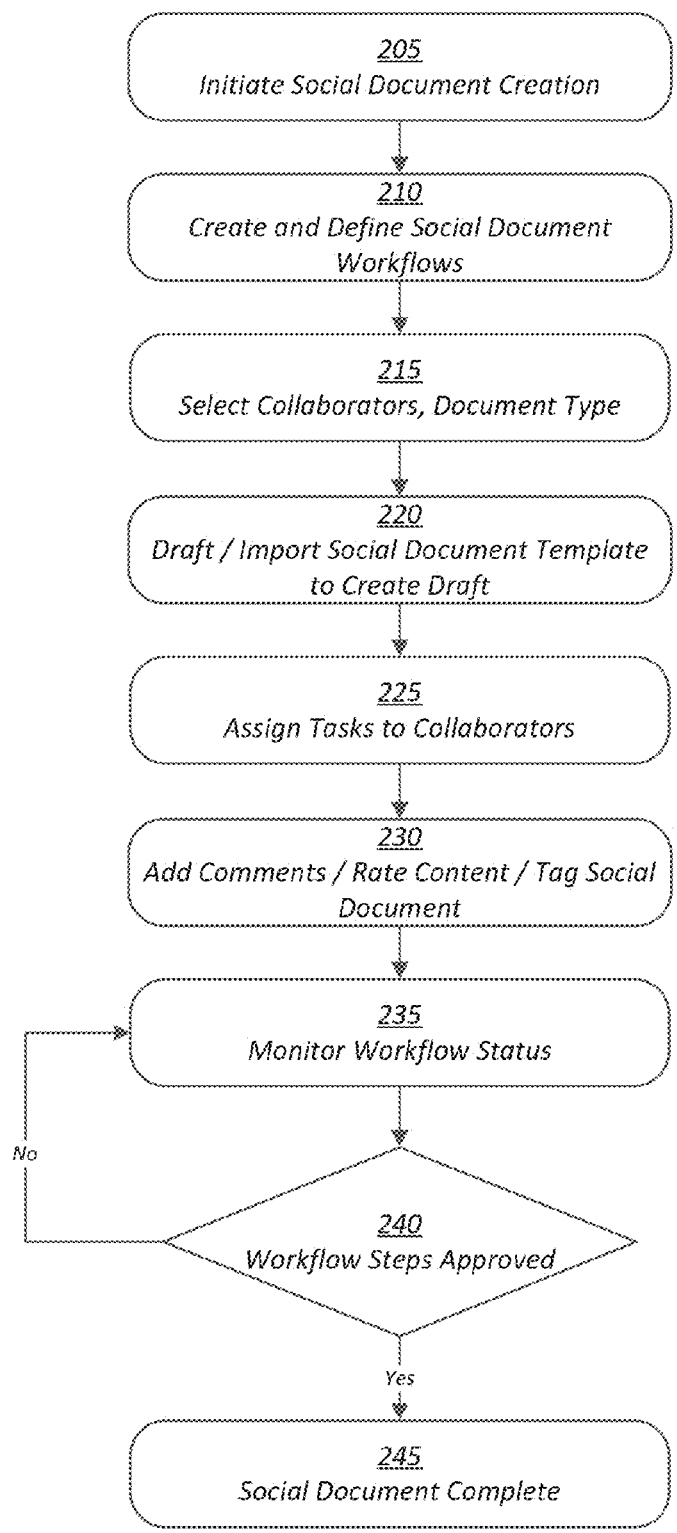
FIG. 2 illustrates an embodiment of a logic flow.

FIG. 2 illustrates one embodiment of a logic flow 200. The logic flow 200 may be representative of some or all of the operations executed by one or more embodiments described herein. In the illustrated embodiment shown in FIG. 2, the logic flow 200 may permit the creation of a social document. The social document may represent the evolution of a collaborative effort among multiple users to create a finished document to fit a particular need or request. The social document may be owned by a single user while the remaining users may be considered collaborators on the social document. In addition, the owner may assign greater control to other users (e.g., collaborators) thereby providing these users additional control over the social document similar to that of the owner. The owner of the social document may create the template of the initial document and create adhoc workflows designed to methodically address the generation, insertion and group review of the social document. The owner may also select/assign the collaborators to work on the social document. The owner may further assign specific tasks to collaborators directly within a draft or template of the social document. Alternatively, collaborators associated with an adhoc workflow may be given the ability to alter or modify the workflow while it is being worked on. The collaborators may rate content within the social document and/or research materials used to help generate the content to be seen by all other collaborators. The owner and collaborators may monitor task assignments associated with the workflows. The logic flow 200 may be representative of some or all of the operations executed by one or more embodiments described herein.

In the illustrated embodiment shown in FIG. 2, the logic flow 200 may initiate social document creation at block 205. For example, a user via the social docs application 162 executing on the user client computer 160 may access the social document management application 120 executing on the server computer 110 to create a new social document. Specifically, the user may create a new social document by selecting a new document icon 318 from the dashboard interface window 300 of the social document management application 120 shown in FIG. 3. To create a social document, a user/owner may associate a workflow with the social document. The workflow may include one or more steps as illustrated in FIG. 4. Upon clicking the new document icon 318, a flyout box may appear allowing the owner to type the name of the new social document to be created as well as a tentative due date for its completion. The user/owner may now associate a workflow with the new social document. The user/owner may now be presented with the document landing user interface window illustrated in FIG. 6 to further assist in creating the social document. The new social document may then be placed into the documents repository 150 of the server computer 110. The new social document may be visible to the user via the social docs application 162 calling the user interface window for the dashboard view and clicking the documents icon 324 shown in FIG. 3. This view may illustrate all of the social documents associated with that user including those that are owned by the user and those that the user is a collaborator only. Since the user was responsible for creating the new social document, the user is given the label and privileges of being the social document owner.

Figure 5:
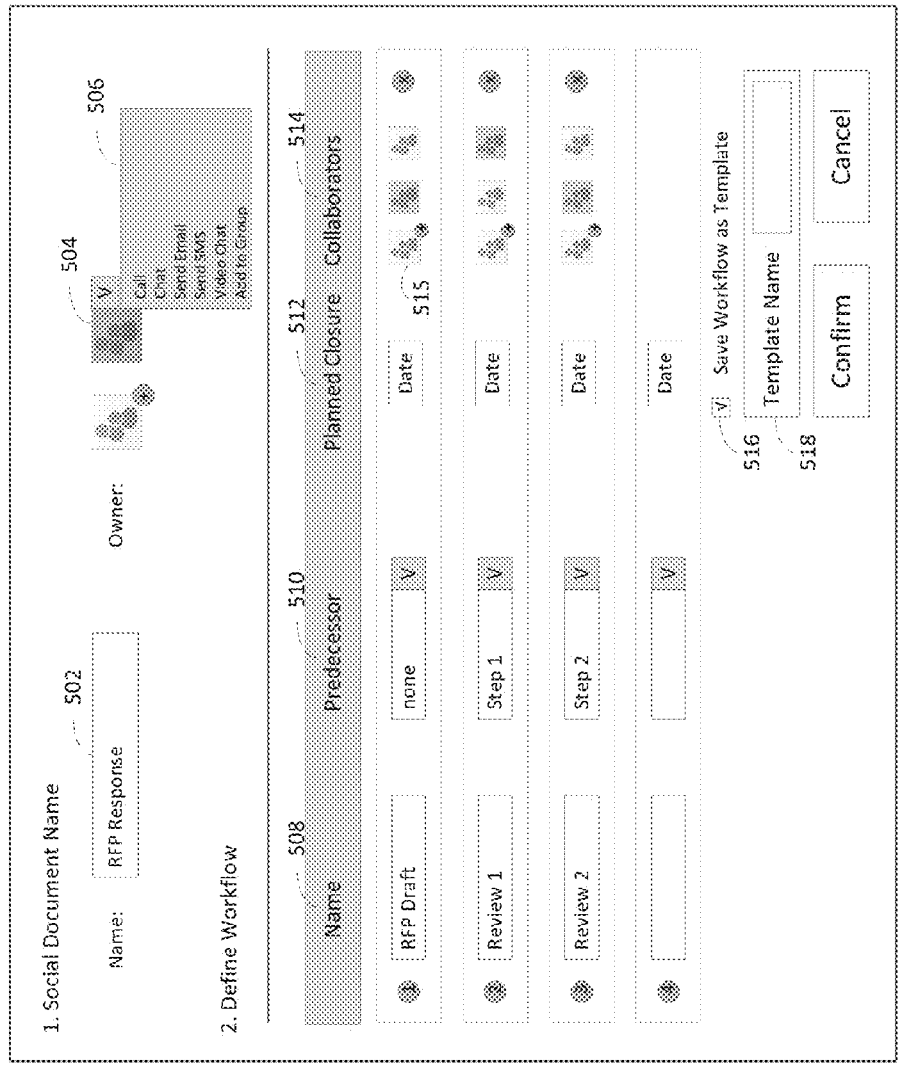
FIG. 5 illustrates an embodiment of a screen shot for one aspect of a user interface for the document creation system.

In the illustrated embodiment shown in FIG. 2, the logic flow 200 may dynamically create and define workflows on an adhoc basis for the social document at block 210. For example, the user/owner of the social document may create a new workflow for the social document by selecting the workflows icon 320 from the dashboard view for documents 300 interface window of the social document management application 120 shown in FIG. 3 or the new workflow icon 406 from the workflow creation user interface window of FIG. 4. A workflow creation user interface window 400 shown in FIG. 4 may appear allowing the user/owner to select from one or more existing workflows or to define a new workflow for the just created new social document. If a new workflow is selected by clicking the new workflow icon 406 shown in FIG. 4, a new workflow definition 500 interface window may appear as shown in FIG. 5. The new workflow definition 500 interface window shown in FIG. 5 may allow the user/owner to enter one or more steps to define the workflow for the social document. Each workflow step may include a name (e.g., first draft), an identification of a predecessor step, a completion date, and a list of user/collaborators. The new workflow may be saved as a template that may be used by future users to create social documents. In addition, selecting the workflows icon 320 of the dashboard view for documents 300 interface window may present the workflow management section of the user interface that allows a user to add, edit, and delete workflows for the social document thereby making the workflow creation and management process dynamic and highly configurable.

In the illustrated embodiment shown in FIG. 2, the logic flow 200 may select collaborators at block 215. For example, the user/owner of the social document may add collaborators 514 to the specific steps of a workflow by selecting an add collaborators icon 515 shown in FIG. 5 while defining a workflow. Selecting the add collaborators icon 515 may launch a flyout box that presents a list of personnel that can be chosen as collaborators and assigned to specific steps of a workflow. Once chosen, a collaborator may be associated with the task and may be notified of the task assignment via a notification such as for example, an email or a text message as well as an alert the next time that collaborator accesses a social docs application 162 dashboard view.

In the illustrated embodiment shown in FIG. 2, the logic flow 200 may draft or import a base document or template at block 220. For example, the user/owner may click on an icon 610 from a document landing screen 600 shown in FIG. 6 that may be associated with a workflow of a social document. This action may launch a flyout box prompting the owner of the social document to select a document type. Examples of document types include a word processor file such as MS Word™, a spreadsheet such as MS Excel™, a slide presentation such as MS Powerpoint™, among others. The specific document types just listed are exemplary only and do not limit the embodiments in any way. For instance, there are many other text and/or graphic based document types that may benefit from the embodiments described herein. Another example may be a PDF document type that may include multiple forms of content embedded therein. Moreover, document types that incorporate one or more of text, graphic, picture, video, and audio content may be considered document types for purposes of the embodiments herein.

Figure 7:
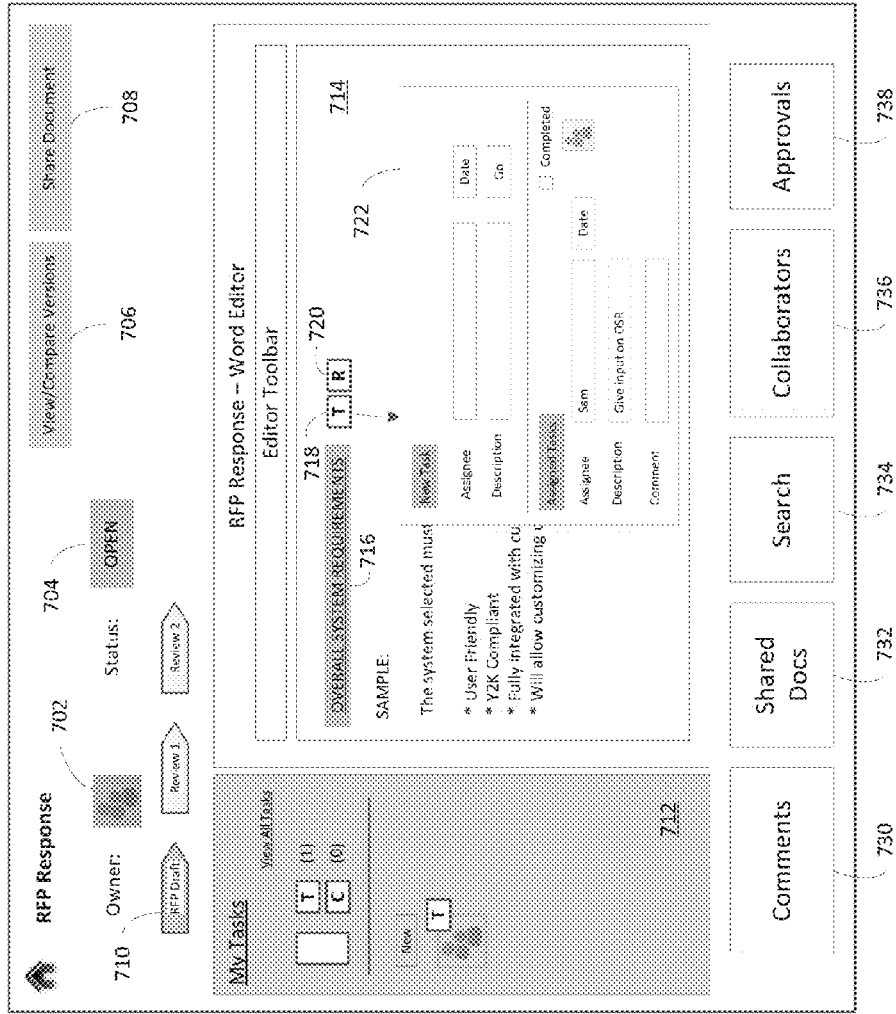
FIG. 7 illustrates an embodiment of a screen shot of a user interface window for one aspect of a user interface for the document creation system.

The owner/user of the social document may then be given the option of creating the selected social document from a blank template, importing an existing template, or importing an existing file to serve as a template. For example, FIG. 7 illustrates a document workspace 700 having a significant portion of the screen occupied by a document editor 714. In this example, the document editor 714 is a word processing program displaying text indicating the document type is a word processing document. The text may have been created or imported from a template or previous document. The workflow information and other social document properties may be maintained separately in an extensible markup language (XML) file for example. This allows the social document management application 120 to support multiple document formats in a generally seamless manner.

In the illustrated embodiment shown in FIG. 2, the logic flow 200 may assign tasks to collaborators at block 225. For example, the owner/user of the social document may highlight portions of the task directly within the social document and assign a task. This is illustrated in FIG. 7 in which the highlighted text 716 causes the appearance of icons for task assignment (T) 718 and content rating (R) 720. Upon selecting the task assignment icon (T) 718, a flyout box 722 may appear prompting for an assignee of the task (e.g., the collaborator to perform the task), a due date for completion of the task, and a description of the task specifics. The assigned task is then stored and its details forwarded to the assignee for action. Thus, the owner/user may assign tasks to collaborators directly from within the social document itself thereby providing a powerful and efficient method of delegating work among the social document collaborators.

In the illustrated embodiment shown in FIG. 2, the logic flow 200 may permit collaborators to tag a social document and add comments and ratings to a social document at block 230. For example, collaborators may select a comments icon 801 shown in FIG. 8 that will launch a flyout box 802 prompting for input from the collaborator in the form of comments. The comments may be viewed by other collaborators and owner of the social document. Similarly, the collaborators may rate the social document or portions of the social document in a flyout box launched by selecting the content rating (R) icon 720 using a scaled system such as, for instance, assigning a number of stars out of a total. The rating is then associated with the collaborator and stored so that other collaborators may view the ratings. Moreover, the ratings function may not be restricted only to the social document being created but may also be available for other documents (e.g., search results) that are relevant to a project. The ratings function helps leverage the knowledge of an enterprise's social network.

Ratings may also be associated with search results. For example, a collaborator may select a search icon 901 from a document workspace window 900 shown in FIG. 9 to launch a search function 902. The collaborator may enter search terms intending to find items, other documents, or sources of information pertaining to the social document or a portion of the social document. Individual search results may be rated as to the relevance to the information sought. A user may also set preferences for search results. For example, in addition to relying on a search algorithm when searching for content pertaining to the social document, the system may allow weighting any rating(s) given by others in the enterprise network that may be returned by the search. If a user searches for "RFP responses", the system may rank previous responses that have been highly rated by the enterprise's social network allowing the enterprise's social network to influence the search results.

In addition, a collaborator may also tag a social document with search terms that should cause the social document to appear in search results when the tag terms are used in a search query. This may be illustrated by a flyout box 906 shown in FIG. 9. A list of tags already assigned to the social document along with the collaborator that added the tags may appear along with a text box that accepts new tag input that may be added and associated with the collaborator that made the addition. In addition to the owner(s) of the social document, the collaborator that added the tag may also delete the tag. Owners always have the ability to delete any tags.

In the illustrated embodiment shown in FIG. 2, the logic flow 200 may monitor the workflow status of the social document at block 235. For example, the owner and collaborators of the social document may track the progress of the various workflows and tasks within workflows via an approvals icon 1101 shown in FIG. 11. Clicking the approvals icon 1101 may launch a flyout box 1102 displaying the various workflow steps 1104, 1106, 1108 and the status of each. Similar information may be viewed from the dashboard view for documents 300 of FIG. 3 (e.g., 308). Thus, the owner of the social document may have access to all workflow task data including the assignee and the approver and can monitor the progress of same.

In the illustrated embodiment shown in FIG. 2, the logic flow 200 may determine the completion status of workflows for the social document at block 240. For example, the owner of the social document may access workflow status information to determine when and if a workflow has been approved by its designated approver collaborator using the approvals icon 1101 of FIG. 11 or the documents icon 324 of FIG. 3. Upon approval of a workflow, the system may generate a message to the owner of the social document indicating completion of the milestone. Once all the workflows have been completed the document is deemed complete at block 245.

The steps and processes set out in the description of the flow diagram of FIG. 2 above may be explained in greater detail with reference to the sample user interface screen shots of the social document management application 120 as illustrated in FIGS. 3-12. In the following screenshots, not every icon is fully described. The screen shots taken collectively describe a computer implemented system and method for creating and developing a social document from inception to completion. Not every possible user interface window has been presented and described. In addition, the order of the screen shots presented is not necessarily relevant to the implementation as some of these screens may be accessed multiple different times during the collaboration process of creating the social document. Nor is the particular arrangement of text, icons, frames, labels, etc. of any given user interface window to be considered necessary to the embodiment shown. It should also be noted that the names or labels given to the screenshots of user interface windows are merely for convenience and illustration purposes.

Figure 3:
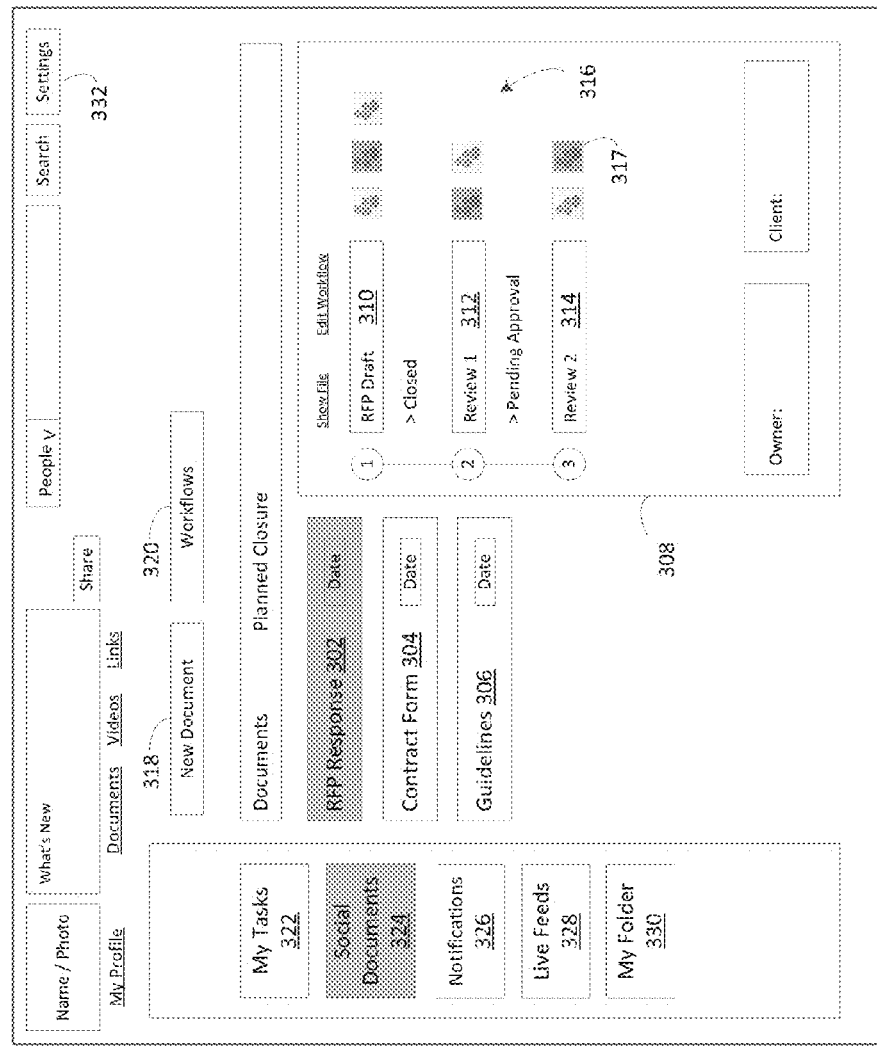
FIG. 3 illustrates an embodiment of a screen shot for one aspect of a user interface for the document creation system.

FIG. 3 illustrates an embodiment of a screen shot of a user interface window for one aspect of a user interface for the social document creation system. This screen shot illustrates a dashboard view for documents 300 for an owner (e.g., user) of a social document. An owner differs from a collaborator in that the owner has responsibilities over the other collaborators. An owner may, however, also act as a collaborator. The overall dashboard view for documents 300 for an owner and a collaborator is essentially the same since a user may be both an owner of one social document and a collaborator on another. The user interface for the social document management application 115 is the same for both owners and collaborators. Owners, however, may have additional functions available to them for social documents they own.

The dashboard view for documents 300 shown here generally includes an area listing all social documents owned or collaborated on by a user as well as a planned completion date. That is because the function "Social Documents" 324 is shown highlighted to indicate that the dashboard view for documents 300 is currently in that mode. In this example, there are three social documents owned by or collaborated on: RFP Response 302, Contract Form 304, and Guidelines 306. The document labeled RFP Response 302 appears highlighted indicating that additional information for that social document appears in a document specifics portion 308 of the window. The document specifics portion of the window 308 illustrates the workflow steps for the selected social document (e.g., RFP Response 302). In this example, the workflow steps include an RFP draft 310, a first review 312, and a second review 314. Each of the workflow steps is associated with one or more collaborators 316 and a status indicator (e.g., closed, pending approval). Collaborators 316 that are shown shaded (e.g., 317) indicate that those collaborators have been assigned approval responsibility for the workflow.

The dashboard view for documents 300 also includes an icon for creating a new social document 318 and an icon for managing workflows 320. The dashboard view for documents 300 also includes a column on left portion of the screen that includes several functional icons such as my tasks 322, social documents 324, notifications 326, live feeds 328, and my folder 330. The my tasks icon 322 allows the user to view tasks that have been assigned for social documents owned and collaborated on. The social documents icon 324 allows the user to view all social documents in which he/she is listed as an owner or collaborator. The notifications icon 326 allows the user to receive and view text based notifications pertaining to items such as new tasks assigned, new comments made on a task assigned to the user, new messages sent to the user, and updates made to the user's document sharing program (e.g., Dropbox™). The live feeds icon 328 allows the user to receive and view real-time actions on social documents involving the user. Live feeds are a text based update on actions such as an owner updating a task, a collaborator commenting on a task, like or dislike tags placed on parts of the social document, etc. The user may opt-in or opt-out of live feeds. Thus, the dashboard view for documents 300 may be characterized as the home page for the social document management application 120. The user(s) may use the dashboard view for documents 300 to access various parts of the entire system. All dashboard views may also include a settings icon 332 that may allow a user to configure his or her presentation of the dashboard view and some aspects of the social docs application 162.

FIG. 4 illustrates an embodiment of a screen shot of a user interface window for one aspect of a user interface for the social document creation system. This screen shot illustrates a document creation view 400 for an owner of a social document. This window may be accessed by clicking the new document icon 318 shown in the user interface window illustrated in FIG. 3. The upper portion of the window of the document creation view 400 allows the owner to enter a new social document name 402 and add owners 404 for the social document being created. The lower portion of the window of the document creation view 400 allows the owner to choose between a new workflow icon 406 or from among existing workflows 408, 410. The owner may make a selection by clicking the new workflow icon 406 or selecting one of the existing workflows 408, 410. If an existing workflow is selected, the owner may then click a go icon to launch the selection.

FIG. 5 illustrates an embodiment of a screen shot of a user interface window for one aspect of a user interface for the social document creation system. This screen shot illustrates a new workflow definition view 500 for an owner of a social document. This window may be accessed by clicking the new workflow icon 406 shown in the user interface window illustrated in FIG. 4. The new workflow definition view 500 identifies the social document 502 and its owner 504 in an upper portion of the window. On hovering above the owner icon 504 will launch a flyout box 506 that presents multiple options to connect and communicate with that individual. These options include placing a call, initiating a chat session, sending an email, sending a text message, initiating a video chat and adding to a group. It should be noted that these options are available from all user interface windows that include a user (e.g., owner or collaborator) whenever a cursor hovers above the user icon.

The lower portion of the window allows the owner to add work flow steps to the new workflow definition. There may be at least four items comprising a workflow step. These include a name 508 for the workflow step, a predecessor identifier 510 that identifies the immediate preceding step to the preset step, a planned closure identifier 512 indicative of the deadline date to complete the step, and a list of the collaborators 514 for the step. At least one of the collaborators 514 for each step will be shaded or otherwise highlighted to indicate that this collaborator may also be the approver of the step and is deemed responsible for completion of this step. Responsibility may include the job of approving the step once satisfactorily completed. An approver may be the collaborator assigned the task, the owner assigning the task, or another collaborator or owner with knowledge of the task.

Once the workflow steps have been created, the owner/user has the option of saving this new workflow definition as a template for future use by checking a box 516 and inserting a template name in a box 518. Once the owner is satisfied with the entries on this new workflow definition user interface window 500, a confirm icon may be clicked to perform the actions just entered. Once a workflow has been created, it may be subsequently modified by the owner/user to add new steps, add collaborators to steps, remove collaborators from steps, etc. Workflow step modifications may then be updated throughout the system and collaborators notified accordingly.

Figure 6:
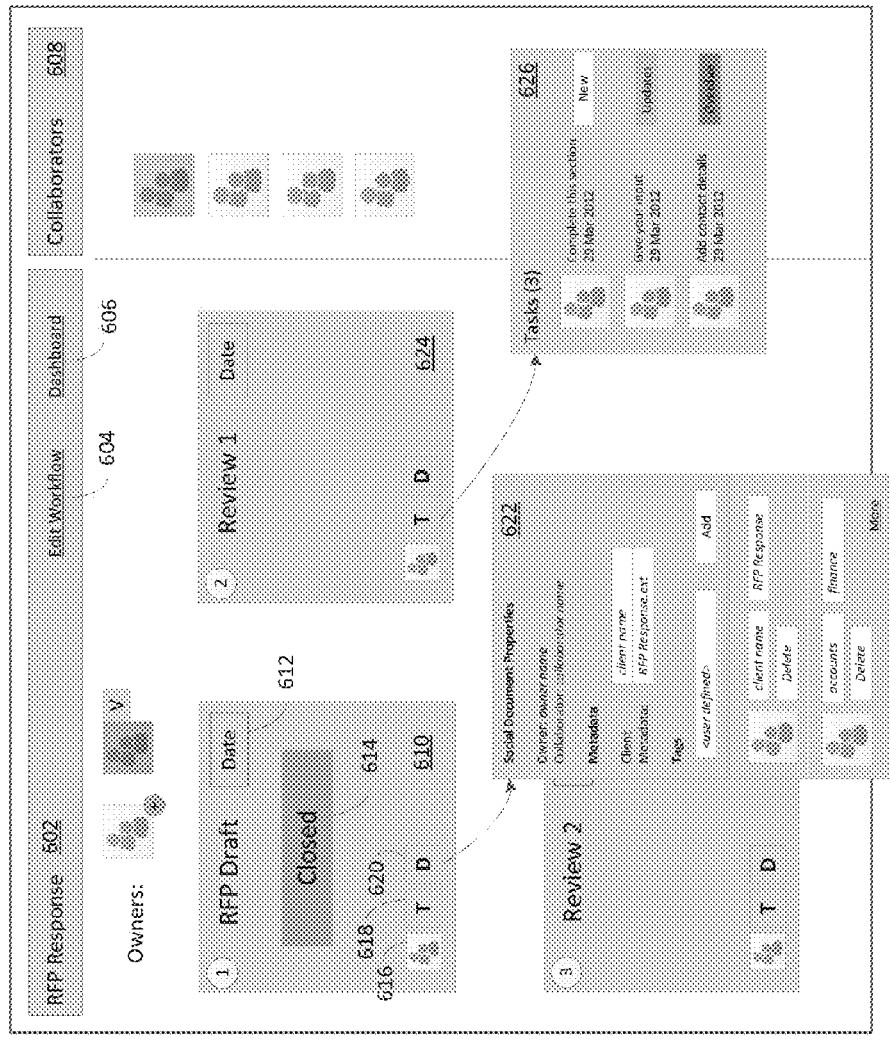
FIG. 6 illustrates an embodiment of a screen shot for one aspect of a user interface for the document creation system.

FIG. 6 illustrates an embodiment of a screen shot of a user interface window for one aspect of a user interface for the social document creation system. This screen shot illustrates a document landing screen 600 for an owner or collaborator of a social document. This window may be accessed by clicking the confirm icon shown in the user interface window illustrated in FIG. 5. Also by clicking a social document name 302, 304, 306 in FIG. 3, the top of the document landing screen 600 presents the name 602 of the social document as well as links for editing the workflow 604 and returning to the dashboard view 606. The right hand portion of the document landing screen lists the various collaborators 608 for the social document. The document landing screen 600 also presents each of the workflow steps in its own portion of the screen. For example, step 1 has been named "RFP Draft" 610 and includes a listing of the due date 612 and the current status 614 of the step. This step is indicated as closed meaning the social document has moved beyond the first step of the workflow definition. The view for the workflow step 610 further includes icons for collaborators 616, tasks (T) 618, and social document properties (D) 620. A flyout box 622 illustrates data pertaining to the social document properties. In this example, the social document properties include data indicative of the owner, collaborators, client, document metadata, and a space to add tags to be associated with the social document for searching purposes. The tags may represent various terms that, when included in a search, may return the social document in the search results. The space for the workflow of step 2 "Review 1" 624 is similarly constructed to the space for the workflow of step 1. In this example, the tasks (T) icon illustrates a flyout box 626 that illustrates the various tasks associated with the workflow definition of step 2. The task listing further includes a listing of the responsible collaborator, a due date, and a status indicator (e.g., new, updates, overdue). For example, three (3) tasks are illustrated in the flyout box 626.

FIG. 7 illustrates an embodiment of a screen shot of a user interface window for one aspect of a user interface for the social document creation system. This screen shot illustrates a document workspace 700 for a user of a social document. This window may be accessed by clicking one of the workflow steps (e.g., 610 when status is OPEN for the step) shown in the user interface window illustrated in FIG. 6. The document workspace 700 identifies the social document name as well as the owner 702, a status 704 (e.g., open), a view/compare function icon 706, a share document icon 708 (or other document sharing application), and an ordered list 710 of the workflow steps with the one currently in use being highlighted. The left portion of the document workspace 700 may include a region illustrating the tasks 712 associated with the user and this workflow step. A substantial portion of the document workspace 700 may be reserved for a document editor 714. The specific document editor 714 may depend on the type of social document (e.g., word processing, spreadsheet, slide presentation, etc.).

In this example, the document associated with workflow step 1 is a word processing document and the document editor 714 may be a word processing program. There may be some text in the document editor 714. One of the features of the social document management application is a contextual task assignment feature. The contextual task assignment feature permits a user to highlight a portion of the social document text 716 and launch a task assignment flyout box 722 from a selection of functions that may appear upon highlighting the text 716. In this example, the functions available for the highlighted text 716 may include assigning a task (T) icon 718 and rating (R) icon 720 this portion of the social document. A rating may be associated with the collaborator making the rating.

The task assignment flyout box 722 may include fields for an assignee of the task, a description of the task, a due date for the task if the task is a new task. If the task has already been assigned, the fields for assignee, due date and description may already be filled in as well as a status indicator. The task may then be recorded and forwarded to the assignee (e.g., collaborator). The assignee may then be informed of the assigned task upon viewing their own customized dashboard view. The assignee may also be sent a notification message (e.g., text message, email) informing of the newly assigned task.

The bottom portion of the document workspace 700 may include multiple icons that may launch flyout boxes pertaining to the function described. For example, a comments icon 730 may launch a flyout box designed to allow comments to be added to a social document in the workflow. A share document (e.g., document sharing application) icon 732 may launch a flyout box designed to allow a user to search and place a document into another collaborator's inbox for a document sharing application. The shared document(s) may be research obtained through a search that one collaborator provides another to assist in the content creation of the social document. A search icon 734 may launch a flyout box designed to allow a user to search for references to assist in creating content for the social document. A collaborators icon 736 may launch a flyout box that may illustrate all the collaborators for the social document. An approvals icon 738 may launch a flyout box that may illustrate the workflow steps and their approval status.

Figure 8:
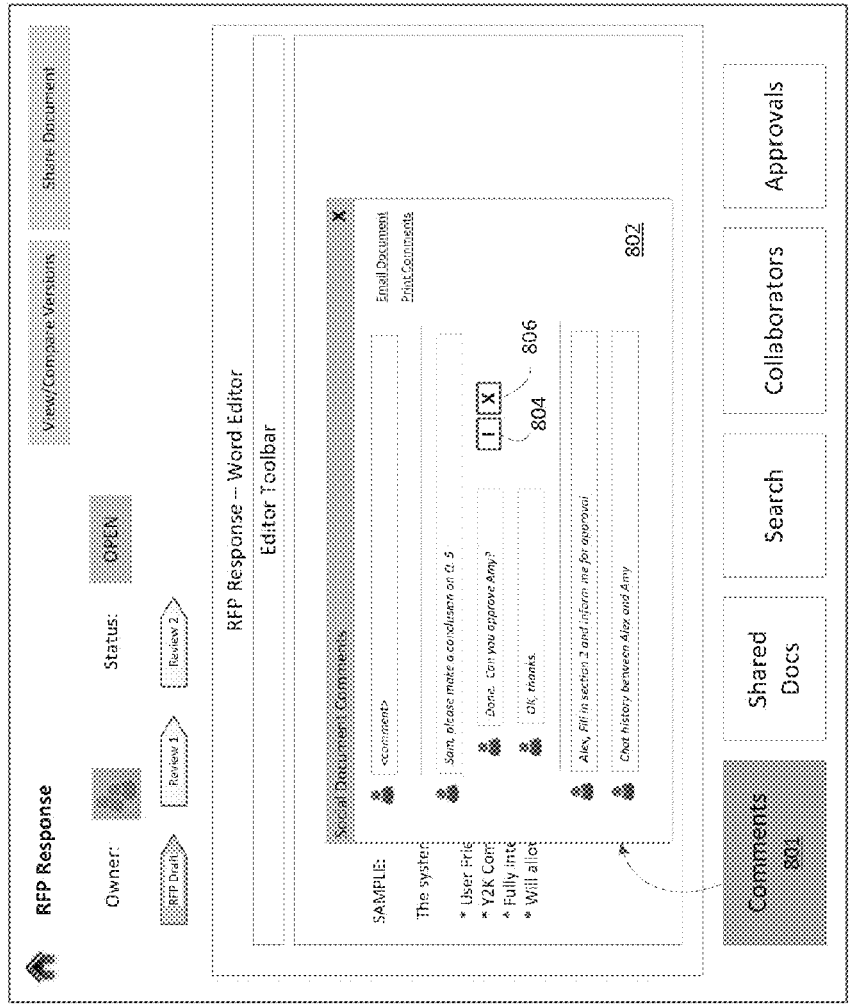
FIG. 8 illustrates an embodiment of a screen shot of a user interface window for one aspect of a user interface for the document creation system.

FIG. 8 illustrates an embodiment of a screen shot of a user interface window for one aspect of a user interface for the social document creation system. This screen shot illustrates a document workspace 800 for a user of a social document with a comment flyout box 802. This window may be accessed by clicking the comments icon shown in the user interface window illustrated in FIG. 7. The comment flyout box 802 provides a comments trail for the social document that may be made available to all document collaborators. The comments may be arranged chronologically in a thread of related responses. Each comment may have a collaborator preceding a text box attributable to that collaborator. Hovering a cursor over a comment may present pop-up options for that comment including one (X) 804 to delete the comment and another (I) 806 to import files that others viewing the comment may refer.

Figure 9:
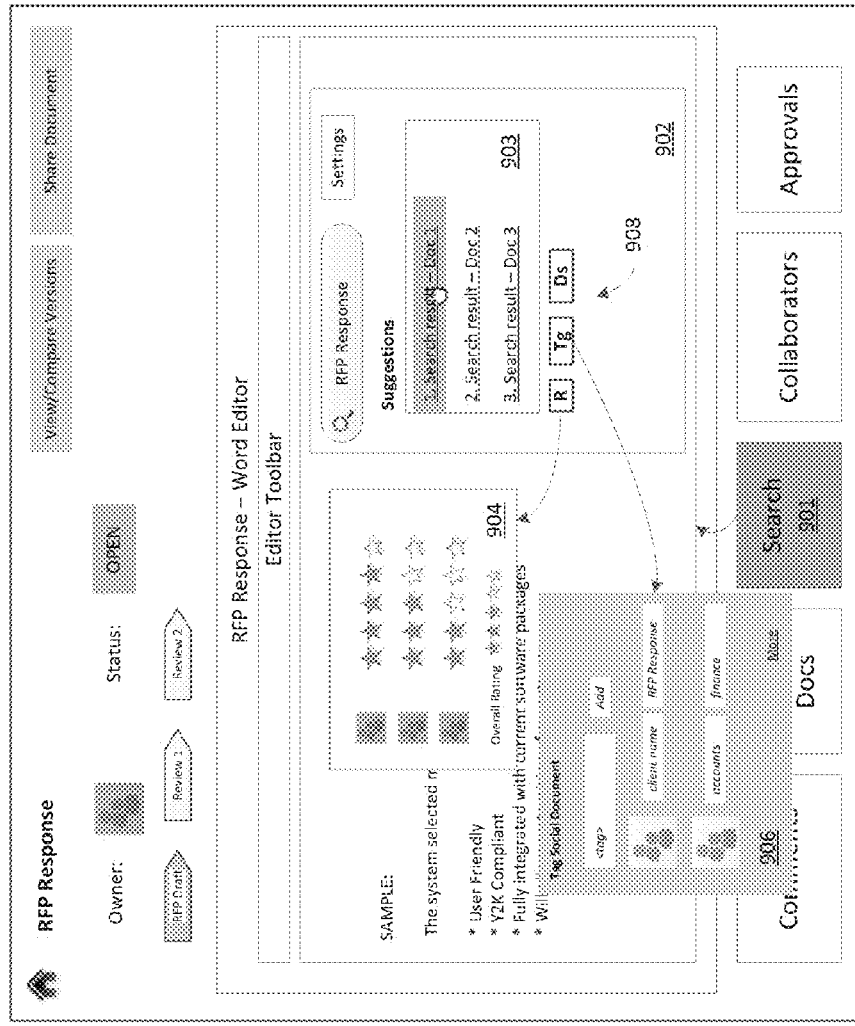
FIG. 9 illustrates an embodiment of a screen shot of a user interface window for one aspect of a user interface for the document creation system.

FIG. 9 illustrates an embodiment of a screen shot of a user interface window for one aspect of a user interface for the social document creation system. This screen shot illustrates a document workspace 900 for a user of a social document in which a search flyout box 902, a ratings flyout box 904, and a tag flyout box 906 are shown. This window may be accessed by clicking the search icon shown in the user interface window illustrated in FIG. 7. The search flyout box 902 may include an area to input a search term. In this example, the search term is 'RFP Response'. The search may be conducted over one or more data repositories containing documents that may include the search term. The results of the search 903 may be presented to the user along with a floating menu 908 that allows the user to rate (R), tag (Tg) or send the search results to another user's document sharing application (Ds). The floating menu may only apply to whichever search result a cursor may be hovering over at a given time.

The user may opt to rate one of the documents in the search result. The rating flyout box 904 may present the ratings of other collaborators as well as an overall average rating. In addition, the ratings may be presented based on preferences set by the user in his or her settings configuration. The user may also rate the search result. The ratings may be based on a scaled ranking. In this example, the scaled ranking runs from 1-5 as indicated by a series of stars. Stars that are shaded indicate a ranking. Three previous collaborators have rated this document with four, three, and two stars yielding an average rating of 3 stars. The user may then add his or her own rating if desired.

The user may also opt to tag the search results to assist in future searches. The tag flyout box 906 allows a user to insert a tag to be associated with the document during future searches. This tag flyout box indicates that the name of the client (e.g., client name), the name of the document (e.g., RFP Response) and the terms account and finance have been associated with this document. The tag flyout box also includes a space to add a new tag. Tags may be any terms relevant to the social document including, but not limited to, client name, document name, document subject, etc.

Figure 10:
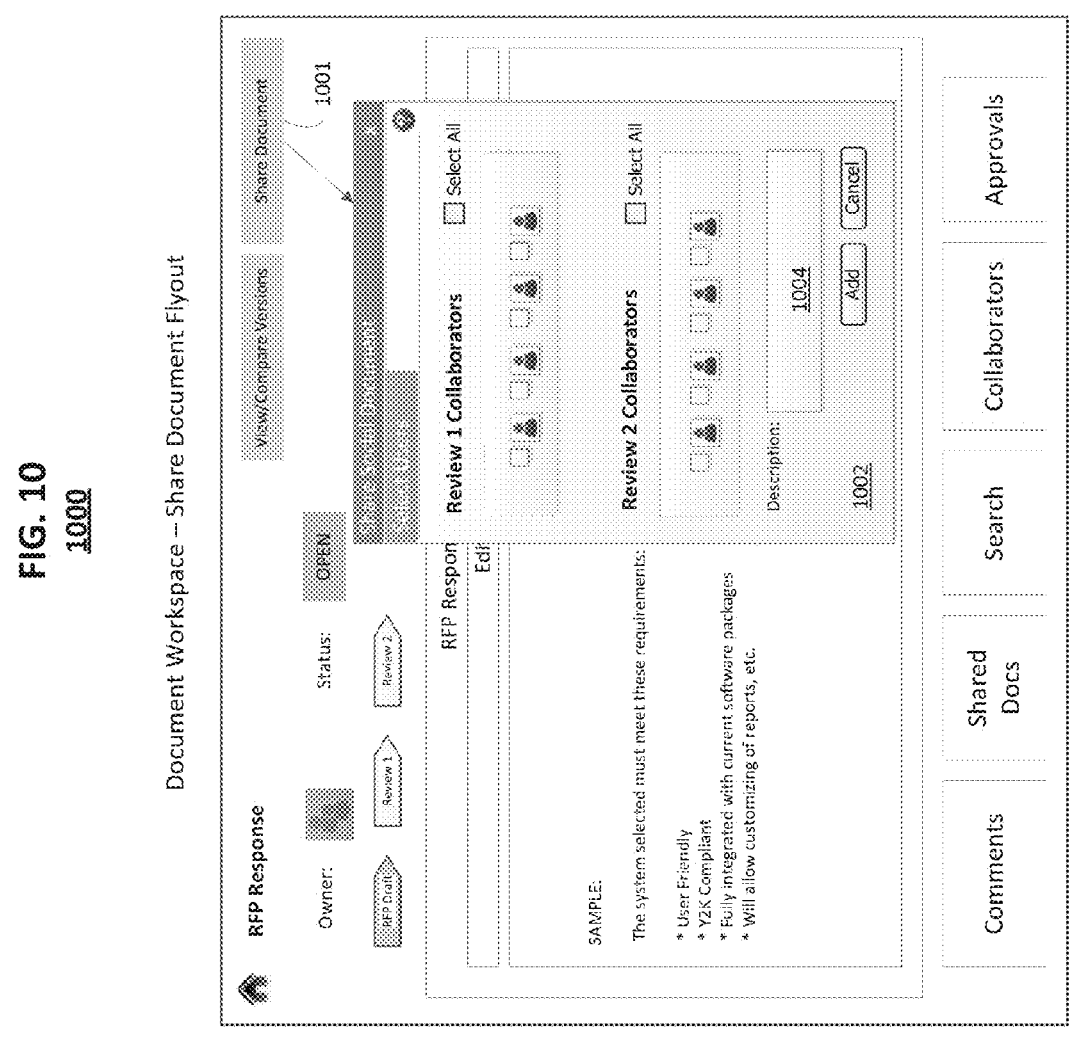

FIG. 10 illustrates an embodiment of a screen shot of a user interface window for one aspect of a user interface for the social document creation system. This screen shot illustrates a document workspace 1000 for a user of a social document in which a share document flyout box 1002 is shown. This window may be accessed by clicking the share document icon 1001 shown in the user interface window illustrated in FIG. 10. The share document flyout box 1002 may include a list of collaborators for various steps of the workflow definition. In this example, a list of collaborators for step 2 (Review 1) is shown with blank check boxes next to the name/image of the collaborator. Similarly, a list of collaborators for step 3 (Review 2) is shown with blank check boxes next to the name/image of the collaborator. The user may select any number of the blank check boxes and provide a text description of the shared document in a text box 1004. The user may then hit the add key (or its equivalent) to share the social document with the selected collaborators.

Figure 11:
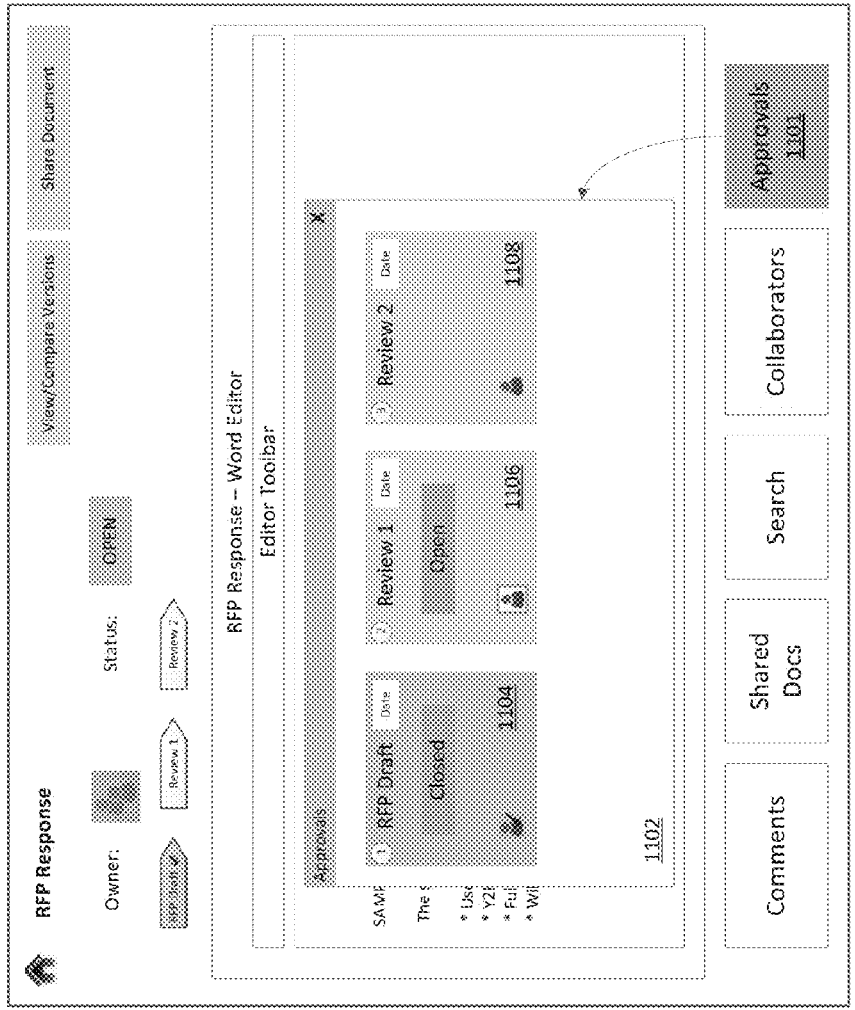
FIG. 11 illustrates an embodiment of a screen shot of a user interface window for one aspect of a user interface for the document creation system.

FIG. 11 illustrates an embodiment of a screen shot of a user interface window for one aspect of a user interface for the social document creation system. This screen shot illustrates a document workspace 1100 for a user of a social document in which an approvals flyout box 1102 is shown. This window may be accessed by clicking the approvals icon shown in the user interface window illustrated in FIG. 7. The approvals flyout box 1102 may present each of the steps of the workflow for the social document. In this example, the steps of the workflow include the RFP Draft 1104, Review 1 1106, and Review 2 1108. In addition, the date and status for each of the steps is presented as well as the responsible collaborator. The portion of the approvals flyout box 1102 containing each step may be shaded, colored or otherwise highlighted to indicate status. For example, a step outlined in green may indicate that the step has been completed and approved. Similarly, a step outlined in yellow may indicate that the tasks for the workflow step have been completed but not yet approved. A step outlined in red may indicate that one or more tasks for the workflow step have yet to be completed. A step is fully highlighted in yellow may indicate that the due date is within 48 hours (or some other pre-determined time parameter). A step fully highlighted in red may indicate that completion of the workflow step is now overdue.

Figure 12:
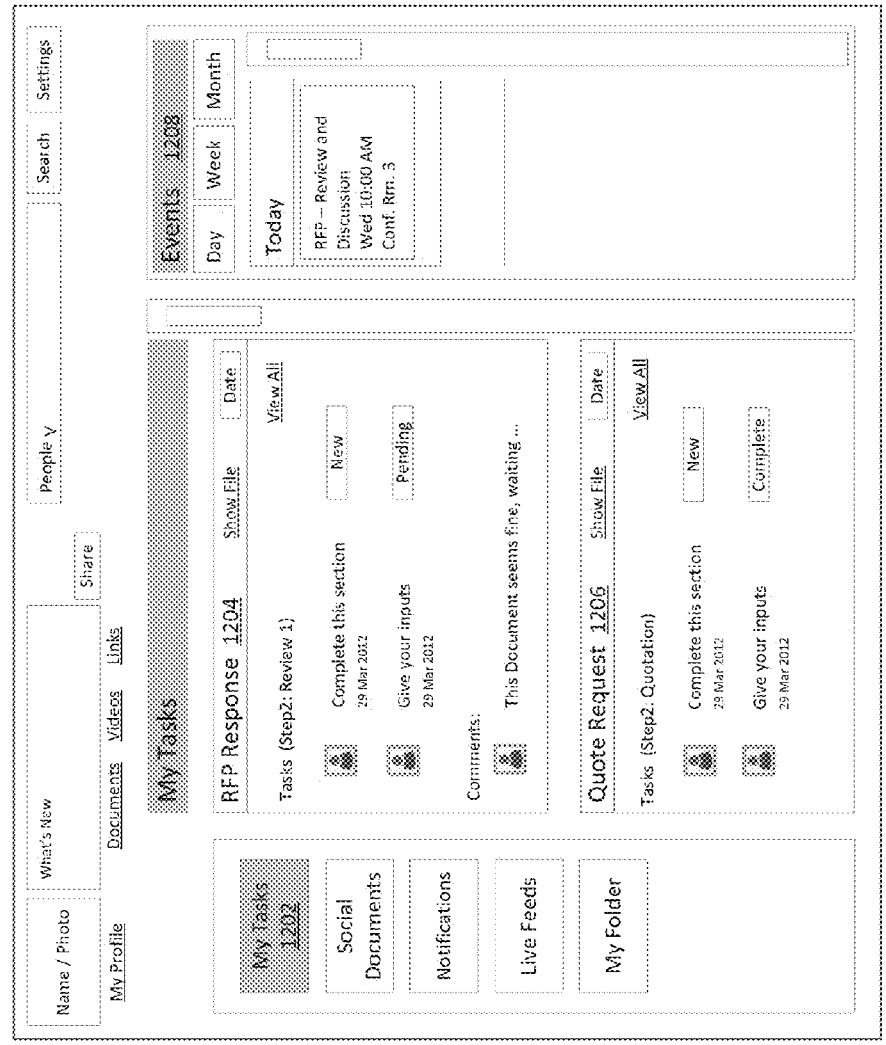
FIG. 12 illustrates an embodiment of a screen shot of a user interface window for one aspect of a user interface for the document creation system.

FIG. 12 illustrates an embodiment of a screen shot of a user interface window for one aspect of a user interface for the social document creation system. This screen shot illustrates a dashboard view for tasks 1200 for a collaborator (e.g., user) of a social document. The dashboard view for tasks 1200 shown here generally includes an area listing all tasks assigned to the collaborator. That is because the function "My Tasks" 1202 is shown highlighted to indicate that the dashboard view for tasks 1200 is currently in that mode. In this example, there are two social documents—RFP Response 1204 and Quote Request 1206 shown. Each of these social documents 1204, 1206 includes a listing of tasks pertaining to a particular step of a workflow for that social document. For example, two tasks are shown associated with step 2 of the RFP Response social document 1204 and two tasks are shown associated with step 2 of the Quote Request social document 1206. The tasks are presented by illustrating the owner who assigned the task, a text description of the task, a due date for completion of the task, and a status of the task. The status may include states such as new, pending, complete, and overdue among others. Each of these states may be colored or shaded on the screen or otherwise highlighted to give a stronger visual indication of the task's status. For example, completed tasks may be colored or shaded green while overdue tasks may be colored or shaded red.

The dashboard view 1200 may also include an events portion 1208 that indicates a schedule of events pertaining to the social documents that are associated with the user. The schedule may offer the user the ability to view by the day, week or month. In this example, a meeting to review and discuss the RFP has been scheduled for today at 10:00 AM in conference room 3.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A system comprising:
a server, the server including a processor and a memory, the server to execute a social document management application to:
create a social document template that defines a structure for a social document that receives textual content authored by one or more collaborators;
dynamically create a configurable adhoc workflow process associated with the social document, the adhoc workflow process including a plurality of steps to create the textual content for the social document;
assign tasks to the one or more collaborators, the tasks associated with the steps of the adhoc workflow process, the tasks assigned by selecting textual content directly within the social document and assigning a task pertaining to the selected textual content, wherein the assignment of the tasks associates the one or more collaborators with the adhoc workflow process;
provide one or more interfaces that allow a reviewer to associate one or more data items with a corresponding portion of the social document, wherein the one or more data items are searchable to enable viewing of at least the one or more data items and at least one collaborator who performed a task pertaining to the textual content of the corresponding portion of the social document associated with the data item;
record a plurality of data items in association with corresponding portions of the social document received through the one or more interfaces, including a first rating to be linked to (i) a first portion of the social document, and (ii) at least one collaborator who performed a corresponding task pertaining to textual content of the first portion of the social document; and
approve the plurality of steps of the adhoc workflow process.

2. The system of claim 1, wherein the server executes a social document management application further to select a document type for the social document template, the document type including at least one of text, graphic, and picture content.

3. The system of claim 1, wherein the server executes a social document management application further to send a text based notification to a collaborator when an event pertaining to the social document has occurred, the event including at least one of a new comment pertaining to a task, a new message, a new task assignment, or an update to a shared documents application.

4. The system of claim 1, wherein the plurality of steps of the adhoc workflow process include a name for each step, a due date for each step, an identification of a predecessor step, an approver of each step, and collaborators for each step.

5. The system of claim 1, wherein the server executes a social document management application further to provide the one or more interfaces from directly within the social document upon the textual content being highlighted, and to share the data items with other collaborators.

6. A computer-implemented method, comprising:
creating a social document template that defines a structure for a social document that receives textual content authored by one or more collaborators;
dynamically creating a configurable adhoc workflow process associated with the social document, the adhoc workflow process including a plurality of steps to create the textual content for the social document;
assigning tasks to the one or more collaborators, the tasks associated with the steps of the adhoc workflow process, the tasks assigned by selecting textual content directly within the social document and assigning a task pertaining to the selected textual content, wherein the assignment of the tasks associates the one or more collaborators with the adhoc workflow process;
providing one or more interfaces that allow a reviewer to associate one or more data items with a corresponding portion of the social document, wherein the one or more data items are searchable to enable viewing of at least the one or more data items and at least one collaborator who performed a task pertaining to the textual content of the corresponding portion of the social document associated with the data item;
recording a plurality of data items in association with corresponding portions of the social document received through the one or more interfaces, including a first rating to be linked to (i) a first portion of the social document, and (ii) at least one collaborator who performed a corresponding task pertaining to textual content of the first portion of the social document; and
approving the plurality of steps of the adhoc workflow process.

7. The computer-implemented method of claim 6, further comprising selecting a document type for the social document template, the document type including at least one of text, graphic, and picture content.

8. The computer-implemented method of claim 6, further comprising sending a text based notification to a collaborator when an event pertaining to the social document has occurred, the event including at least one new comment pertaining to a task, a new message, a new task assignment, or an update to a shared documents application.

9. The computer-implemented method of claim 6, wherein the plurality of steps of the adhoc workflow process include a name for each step, a due date for each step, an identification of a predecessor step, an approver of each step, and collaborators for each step.

10. The computer-implemented method of claim 6, wherein providing the one or more interfaces includes providing the one or more interfaces from directly within the social document upon the textual content being highlighted, and sharing the data items with other collaborators.

11. A non-transitory computer-readable storage medium comprising instructions that, when executed by at least one processor of a system, cause the system to:
create a social document template that defines a structure for a social document that receives textual content authored by one or more collaborators;
dynamically create a configurable adhoc workflow process associated with the social document, the adhoc workflow process including a plurality of steps to create the textual content for the social document;
assign tasks to the one or more collaborators, the tasks associated with the steps of the adhoc workflow process, the tasks assigned by selecting textual content directly within the social document and assigning a task pertaining to the selected textual content, wherein the assignment of the tasks associates the one or more collaborators with the adhoc workflow process;
provide one or more interfaces that allow a reviewer to associate one or more data items with a corresponding portion of the social document, wherein the one or more data items are searchable to enable viewing of at least the one or more data items and at least one collaborator who performed a task pertaining to the textual content of the corresponding portion of the social document associated with the data item;

record a plurality of data items in association with corresponding portions of the social document received through the one or more interfaces, including a first rating to be linked to (i) a first portion of the social document, and (ii) at least one collaborator who performed a corresponding task pertaining to textual content of the first portion of the social document; and approve the plurality of steps of the adhoc workflow process.

12. The non-transitory computer-readable storage medium of claim 11, comprising instructions that when executed by the at least one processor of the system, cause the system to select a document type for the social document template, the document type including one or more of text, graphic, and picture content.

13. The non-transitory computer-readable storage medium of claim 11, wherein the plurality of steps of the adhoc workflow process include a name for each step, a due date for each step, an identification of a predecessor step, an approver of each step, and collaborators for each step.

14. The non-transitory computer-readable storage medium of claim 11, comprising instructions that when executed by the at least one processor of the system, cause the system to provide the one or more interfaces from directly within the social document upon the textual content being highlighted, and to share the data items with other collaborators.

* * * * *